US006306266B1

United States Patent
Metin et al.

(10) Patent No.: US 6,306,266 B1
(45) Date of Patent: Oct. 23, 2001

(54) METHOD OF MAKING A TOP SPIN VALVE SENSOR WITH AN IN-SITU FORMED SEED LAYER STRUCTURE FOR IMPROVING SENSOR PERFORMANCE

(75) Inventors: Serhat Metin, San Jose; Mustafa Pinarbasi, Morgan Hill; Patrick Rush Webb, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/574,682

(22) Filed: May 17, 2000

(51) Int. Cl.$^7$ .................................................. C23C 14/34
(52) U.S. Cl. .............................. 204/192.12; 204/192.11
(58) Field of Search ............................. 204/192.11, 192.2, 204/298.04

(56) References Cited

U.S. PATENT DOCUMENTS

| | | | |
|---|---|---|---|
| 5,751,521 | * 5/1998 | Gill | 360/113 |
| 5,871,622 | * 2/1999 | Pinarbasi | 204/192.11 |
| 6,051,113 | * 4/2000 | Moslehi | 204/298.04 |
| 6,086,727 | * 7/2000 | Pinarbasi | 204/192.11 |
| 6,185,078 | * 2/2001 | Lin et al. | 360/324.12 |

* cited by examiner

Primary Examiner—Nam Nguyen
Assistant Examiner—Gregg Cantelmo
(74) Attorney, Agent, or Firm—G. Marlin Knight; Ervin F. Johnston

(57) ABSTRACT

A method constructs first and second seed layers of a seed layer structure in-situ for a top spin valve sensor for increasing magnetoresistive coefficient dr/R of the sensor, reducing a ferromagnetic coupling field $H_{FC}$ between pinned and free layers of the sensor and reducing coercivity $H_C$ of the free layer. The first layer, which is aluminum oxide ($Al_2O_3$), is ion beam sputter deposited on a first shield layer in a sputtering chamber under a specified pressure. The second seed layer, which is nickel oxide based, is deposited on the first seed layer by ion beam sputter deposition without breaking the vacuum of the chamber. The free layer is then directly deposited on the second seed layer followed by formation of the remainder of the layers of the spin valve sensor. In one embodiment of the invention a read gap layer and the first seed layer are located between a first shield layer and the second seed layer while in the second embodiment of the invention the first seed layer is the only layer between the first shield layer and the second seed layer.

27 Claims, 10 Drawing Sheets

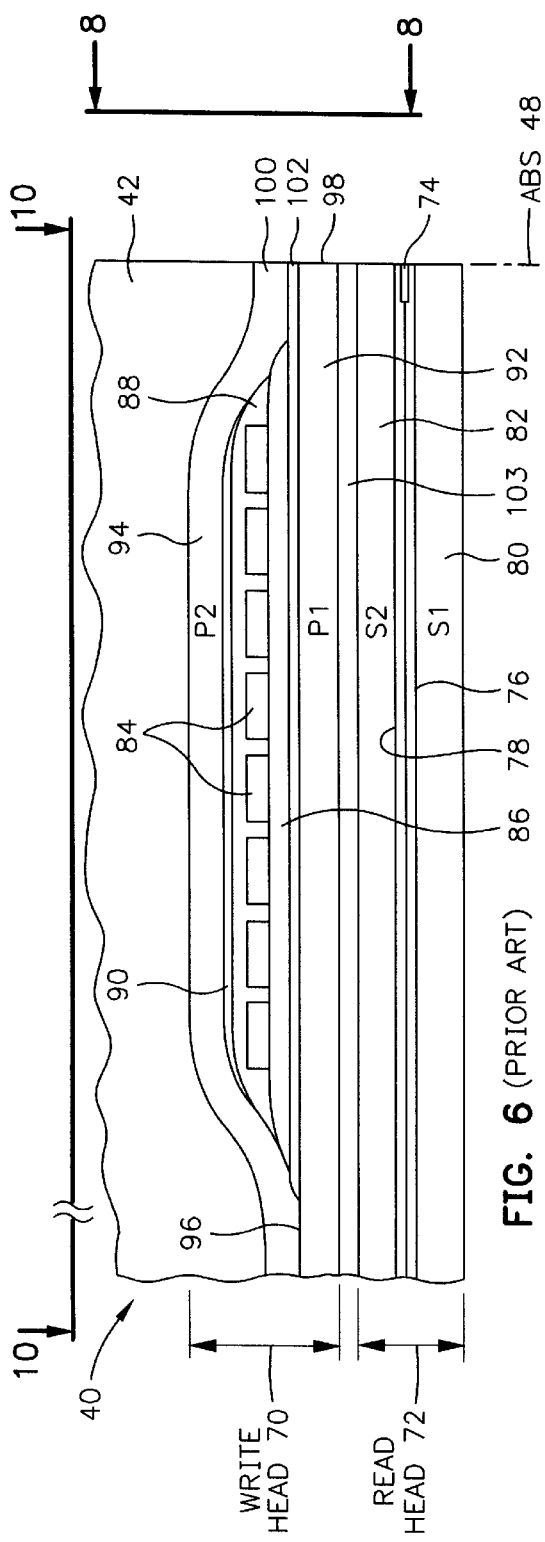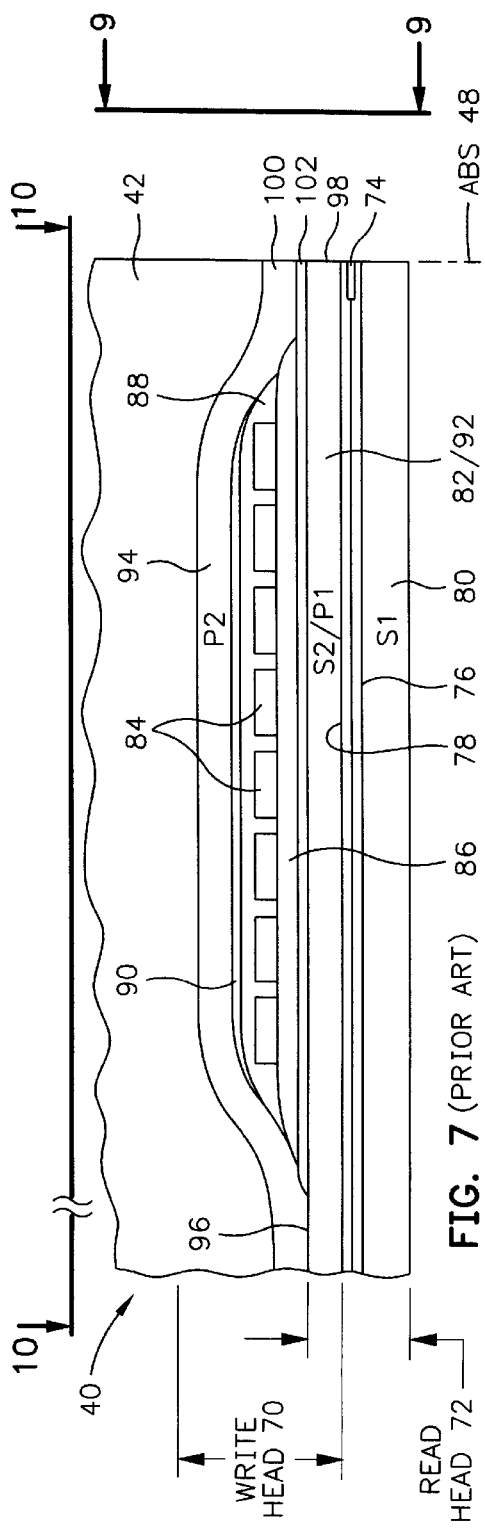
FIG. 6 (PRIOR ART)
FIG. 7 (PRIOR ART)

(ABS)
(PRIOR ART)

METHOD OF MAKING A TOP SPIN VALVE SENSOR WITH AN IN-SITU FORMED SEED LAYER STRUCTURE FOR IMPROVING SENSOR PERFORMANCE

BACKGROUND OF THE INVENTION

1. Field of the Invention

The present invention relates to a method of making a top spin valve sensor with an in-situ formed seed layer structure for improving sensor performance and, more particularly, to a method of making such a seed layer structure by ion beam depositing first and second seed layers in a sputtering chamber without breaking a vacuum in the chamber between the depositions.

2. Description of the Related Art

The heart of a computer is an assembly that is referred to as a magnetic disk drive. The magnetic disk drive includes a rotating magnetic disk, a slider that has read and write heads, a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field writes information in the form of magnetic impressions in circular, tracks on the rotating disk.

An exemplary high performance read head employs a spin valve sensor for sensing magnetic signal fields from the rotating magnetic disk. The sensor includes a nonmagnetic electrically conductive first spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) which is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of $\cos \theta$, where $\theta$ is the angle between the magnetic moments of the pinned and free layers. The sensitivity of the sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. A spin valve sensor is sometimes referred to as a giant magnetoresistive (GMR) sensor.

One of the magnetic fields affecting the aforementioned read signal symmetry is a ferromagnetic coupling field $H_{FC}$ between the pinned and free layers. Because of the thinness of the spacer layer between the pinned and free layers the ferromagnetic coupling field exerted on the free layer is typically in the same direction as the magnetic moments of the pinned layer. Since the ferromagnetic coupling field on the free layer is perpendicular to the ABS this field urges the magnetic moment of the free layer from a desired direction parallel to the ABS, which denotes read signal symmetry when the sensor is in a quiescent condition, to a direction which is between parallel and perpendicular positions with respect to the ABS. Accordingly, it is desirable to minimize the ferromagnetic coupling field in order to promote read signal symmetry.

Another factor affecting the performance of a spin valve sensor is the coercivity $H_C$ of the free layer. This is the amount of field that is required to saturate the magnetic moment of the free layer in the easy axis direction. It is desirable that the coercivity $H_C$ of the free layer be low so that the magnetic moment of the free layer readily responds to signal fields from the rotating magnetic disk. When the coercivity $H_C$ is high the free layer is referred to as being stiff in its operation since the magnetic moment rotates only ga slight distance from its parallel position in response to signal fields from the rotating magnetic disk. A greater rotation of the magnetic moment of the free layer in response to signal fields results in greater positive and negative resistances of the spin valve sensor to the sense current $I_S$ which equates to greater playback signals.

Spin valve sensors are classified as either a top spin valve sensor or a bottom spin valve sensor. In a top spin valve sensor the free layer is located closer to the first shield layer than to the second shield layer and in a bottom spin valve sensor the free layer is located closer to the second shield layer than to the first shield layer. Spin valve sensors are further classified as having a single pinned layer or an antiparallel (AP) pinned layer structure. A single pinned layer may comprise one or more ferromagnetic films interfacing one another whereas in an AP pinned layer structure an antiparallel coupling layer, such as ruthenium (Ru), is located between first and second ferromagnetic layers. The AP pinned layer structure exerts a net demagnetizing field which is less than a demagnetizing field from the single pinned layer structure since the first and second ferromagnetic layers of the AP pinned layer structure have partial flux closure.

Efforts continue to improve the magnetoresistive coefficient dr/R, reduce the ferromagnetic coupling field HFC between the pinned and free layers, and reduce the coercivity $H_C$ of the free layer for improving the performance of the spin valve sensor. These types of efforts have improved the magnetic storage capability of computers from kilobytes to megabytes to gigabytes.

SUMMARY OF THE INVENTION

I have provided a method of making a top spin valve sensor with a seed layer structure which increases the magnetoresistive coefficient dr/R, reduces the ferromagnetic coupling field $H_{FC}$ between pinned and free layers and reduces the coercivity $H_C$ of the free layer. The seed layer structure is formed on a first shield layer in an ion beam sputtering chamber. The first seed layer formed on the first shield layer is composed of aluminum oxide ($Al_2O_3$) and the second seed layer formed on the first seed layer is composed of a nickel oxide based material which is preferably nickel manganese oxide (NiMnO). The first seed layer is preferably formed by reactive ion beam sputtering an aluminum (Al) target in an oxygen atmosphere with the sputtering chamber maintained under a specified vacuum and the second seed layer is nickel manganese oxide (NiMnO) which is formed by reactive ion beam sputtering a nickel manganese (NiMn) target in an oxygen atmosphere on the first seed layer without breaking the specified vacuum. Accordingly, the first and second seed layers are formed in-situ without breaking the vacuum. Ex-situ is forming the seed layers with a vacuum break between the depositions which is typically caused by transferring a wafer substrate from one sputtering chamber to another sputtering chamber. After forming the second seed layer a free layer structure is formed directly thereon. In the preferred embodiment the free layer structure includes a nickel iron (NiFe) free layer which is located between first and second cobalt iron (CoFe) layers with the first cobalt iron (CoFe) interfacing the second seed layer and the second cobalt iron (CoFe) layer interfacing the spacer layer. In one embodiment of the invention a first read gap layer (G1) of aluminum oxide ($Al_2O_3$) is located between the first shield layer and the first seed layer. In this embodiment the first read gap layer is typically formed in a first sputtering chamber and then transferred to a second sputtering chamber, which is the ion beam sputtering chamber, for depositing the first and second seed layers in-situ followed by formation of the remainder of the layers of the spin valve sensor and the read head. In a second embodiment of the invention the first seed layer is the only layer between the first shield layer and the second seed layer, even though the first and second seed layers are ion beam sputter deposited in the second sputtering chamber in-situ. In this embodiment the first seed layer provides a first read gap layer for the read head.

An object of the present invention is to provide a method of making a top spin valve sensor with a seed layer structure that increases the magnetoresistive coefficient dr/R, decreases the ferromagnetic coupling field $H_{FC}$ between pinned and free layers and decreases the coercivity $H_C$ of the free layer.

Other objects and advantages of the invention will become apparent upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
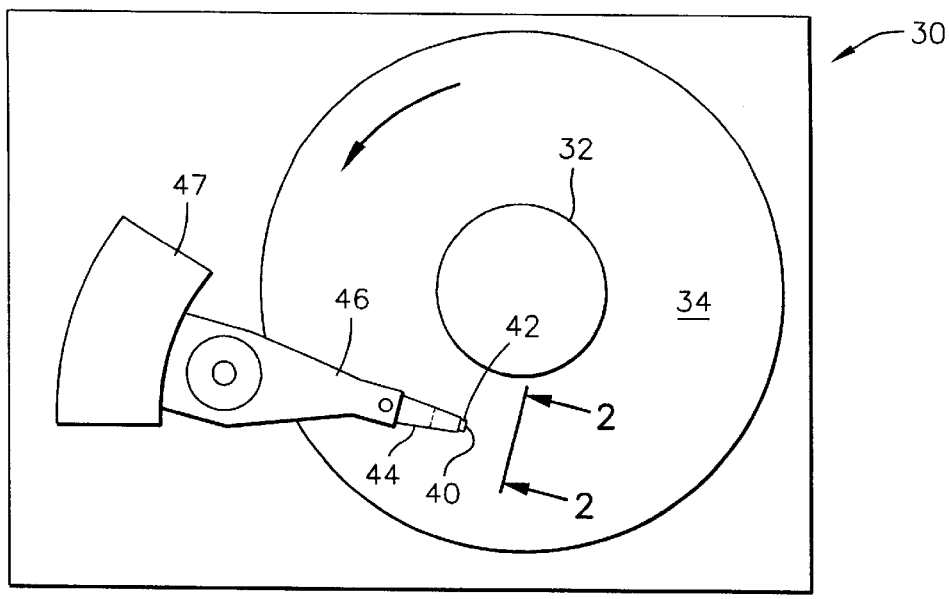
FIG. 1 is a plan view of an exemplary magnetic disk drive.
Figure 2:
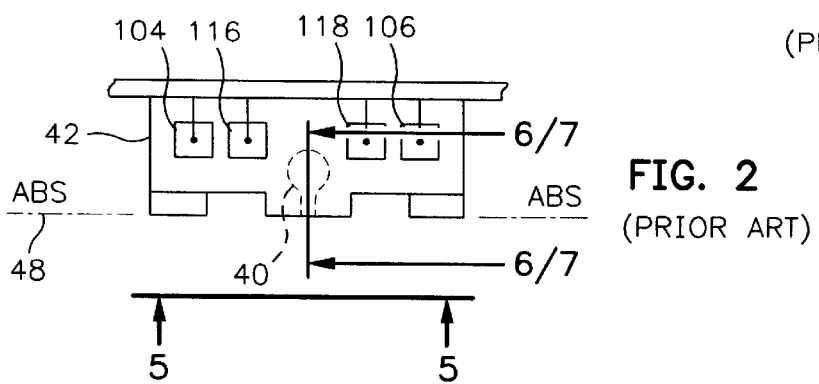
FIG. 2 is an end view of a slider with a magnetic head of the disk drive as seen in plane 2—2.
Figure 3:
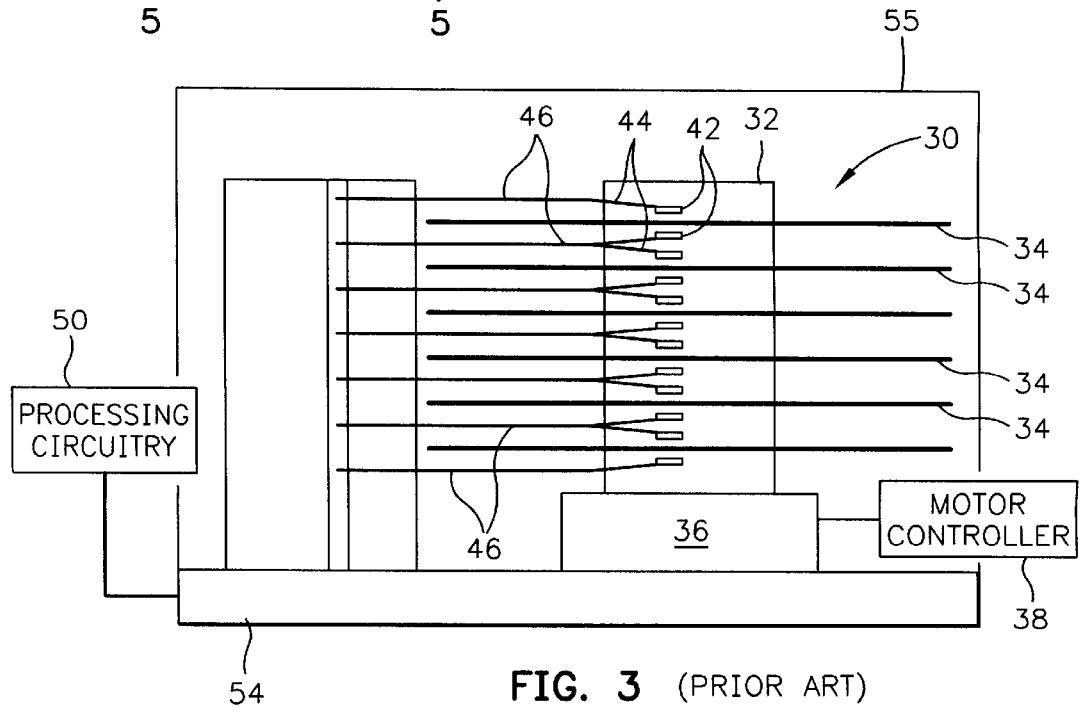
FIG. 3 is an elevation view of the magnetic disk drive wherein multiple disks and magnetic heads are employed.
Figure 4:
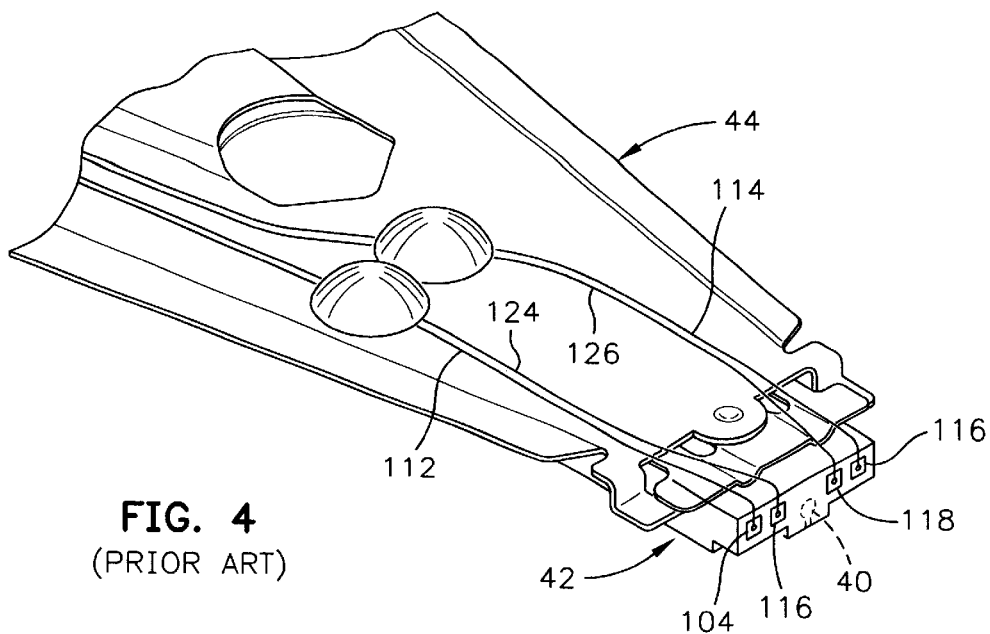
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
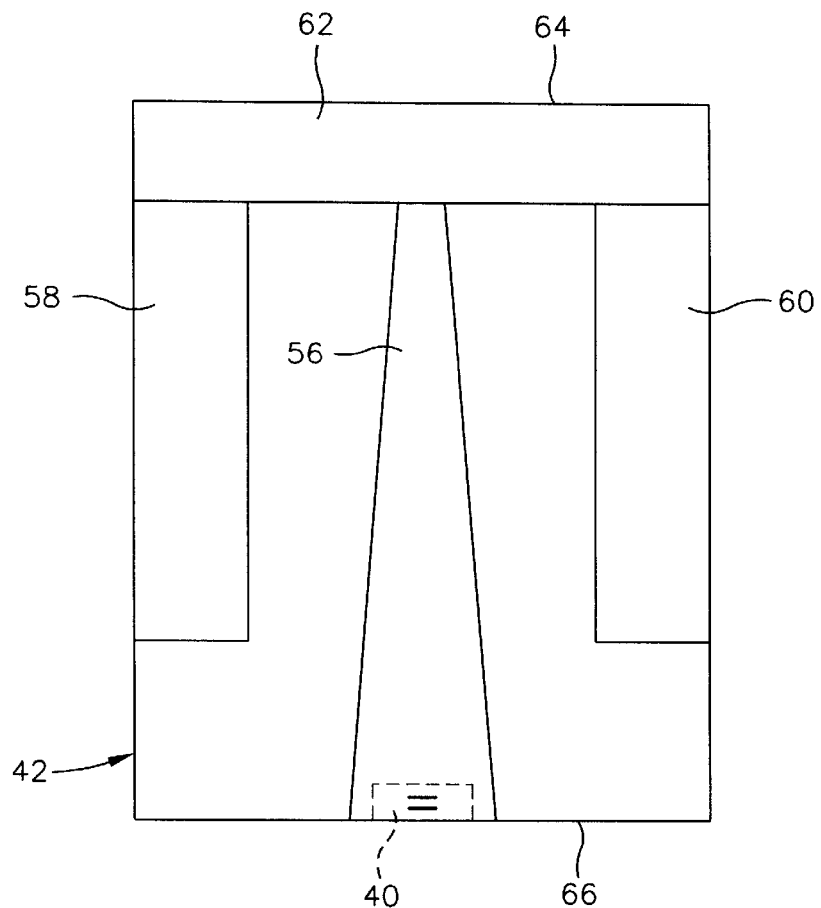
FIG. 5 is an ABS view of the magnetic head taken along plane 5—5 of FIG. 2.
Figure 10:
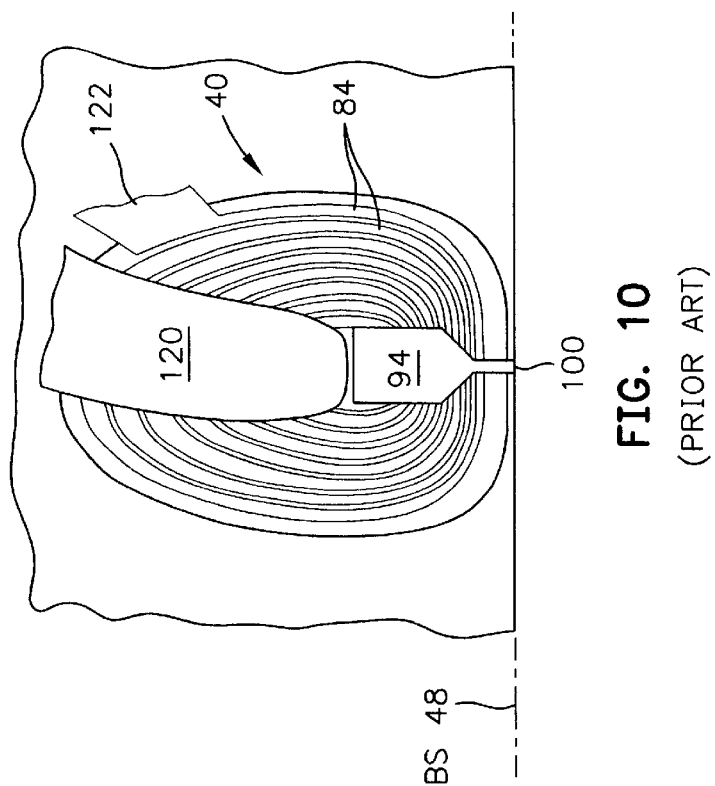
FIG. 10 is a view taken along plane 10—10 of FIGS. 6 or 7 with all material above the coil layer and leads removed.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
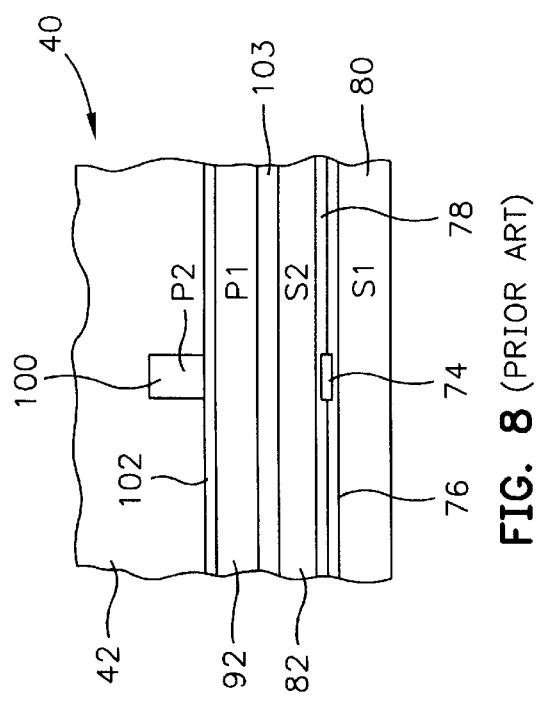
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
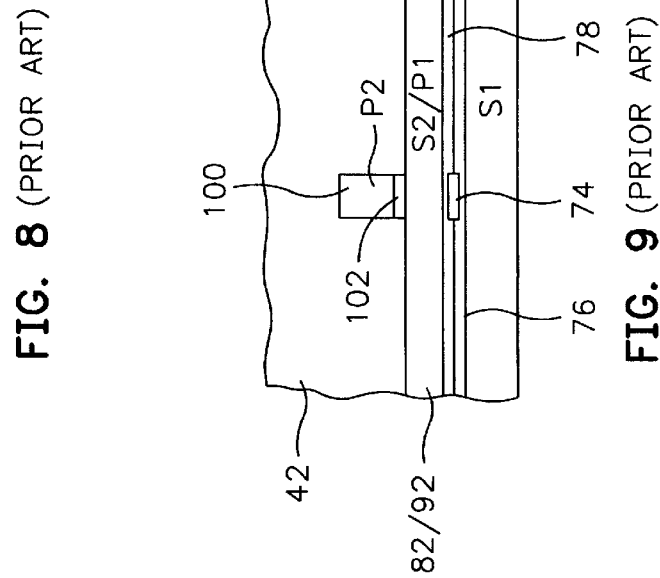
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
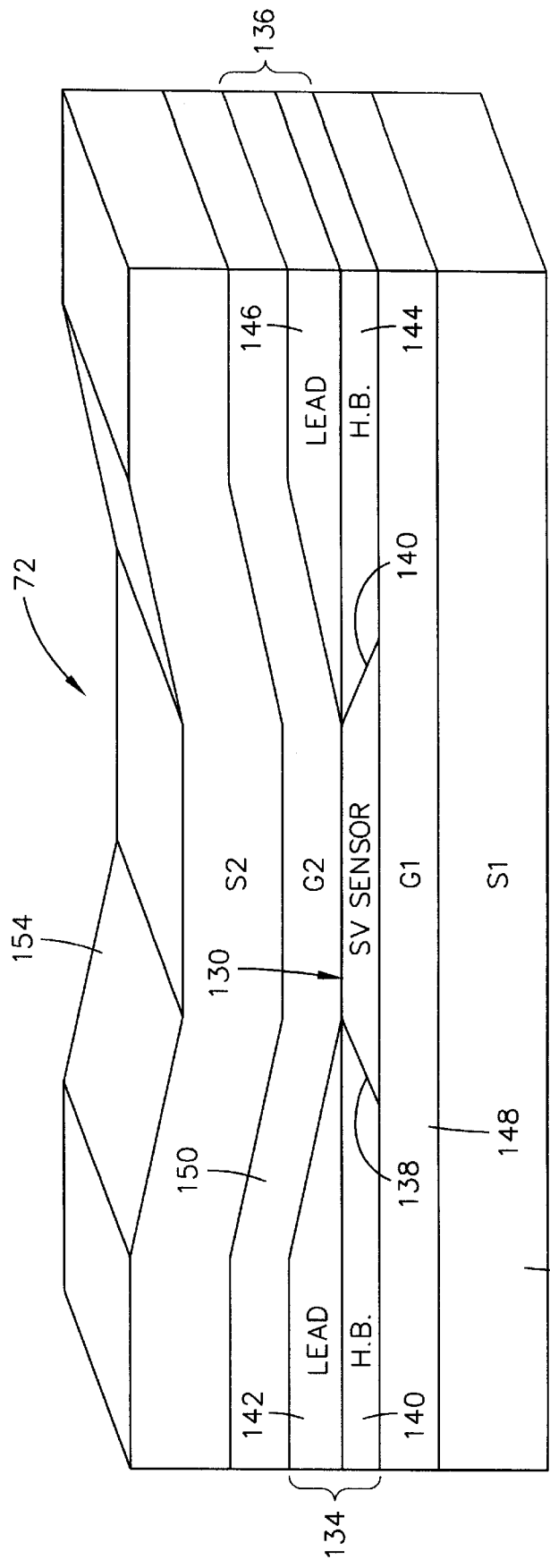
FIG. 11 is an isometric ABS illustration of a read head which employs an AP pinned spin valve (SV) sensor.

FIG. 11 is an isometric ABS illustration of the read head 72 shown in FIGS. 6 or 8. The read head 72 includes a spin valve sensor 130 which may be spin valve sensor 74 in FIGS. 6–9. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

EXAMPLE 1

First Comparative Example of a Top Spin Valve Sensor

Figure 12:
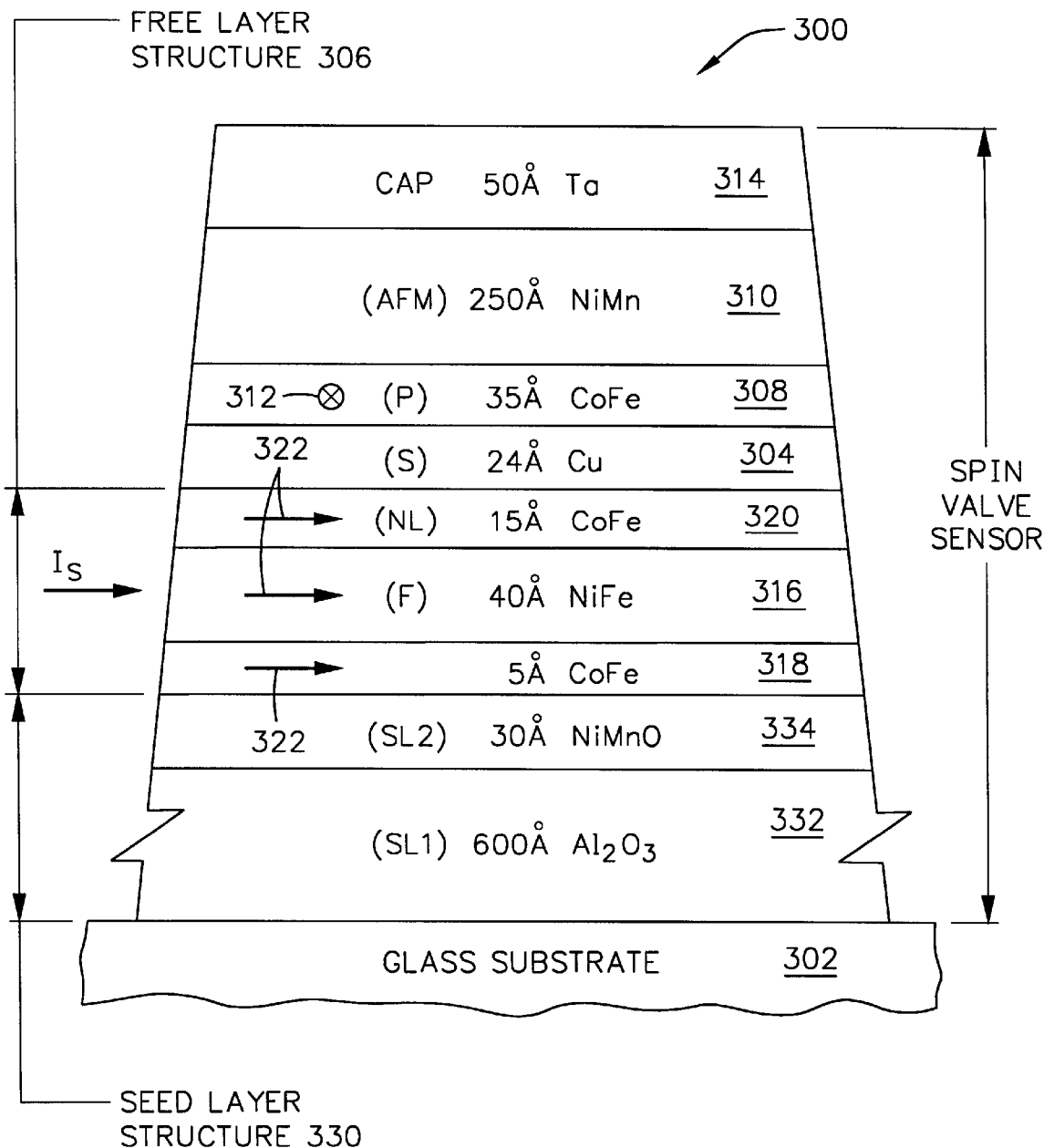
FIG. 12 is an ABS illustration of a first comparative example of a spin valve sensor.

A first comparative example 300 of a top spin valve sensor was constructed on a glass substrate 302, as shown in FIG. 12. The spin valve sensor 300 includes a spacer layer 304 which is located between a free layer structure 306 and a pinned layer (P) 308. An antiferromagnetic (AFM) pinning layer 310 is exchange coupled to the pinned layer 308 for pinning a magnetic moment 312 of the pinned layer perpendicular to the ABS, such as into the sensor as shown in FIG. 12. A cap layer 314 is located on the pinning layer 310 for protecting it from subsequent processing steps.

The free layer structure 306 includes a nickel iron (NiFe) free layer (F) 316 which is located between first and second cobalt iron (CoFe) layers 318 and 320. The second layer 320 is commonly referred to as a nanolayer (NL). The free layer structure has a magnetic moment 322 which is parallel to the ABS in a quiescent condition of the sensor when there is read signal symmetry. When a signal field rotates the magnetic moment 322 into the sensor the magnetic moments 322 and 312 become more parallel which decreases the resistance of the sensor to the sense current $I_S$ and when a signal field rotates the magnetic moment 322 out of the sensor the magnetic moments 322 and 318 become more antiparallel which increases the resistance of the sensor to the sense current $I_S$. These changes in resistance of the spin valve sensor are processed as playback signals by the processing circuitry 50 shown in FIG. 3.

The free layer structure 306 is formed directly on a seed layer structure 330 which comprises first and second seed layers (SL1) and (SL2) 332 and 334. The first seed layer 332 was formed directly on the glass substrate 302 by ion beam sputter deposition in a sputtering chamber under a specified vacuum. The specified vacuum was then broken by being exposed to atmospheric pressure and the sputtering chamber was then maintained under another specified vacuum while the second seed layer 334 was ion beam sputter deposited on the first seed layer 332. Since the vacuum was broken between the depositions of the first and second seed layers 332 and 334, this is referred to in the art as ex-situ deposition. After forming the second seed layer 334 the remainder of the layers 318, 316, 320, 304, 308, 310 and 314 were sequentially ion beam sputter deposited on the second seed layer 334, as shown in FIG. 12.

The thicknesses and materials of the layers were 600 Å of aluminum oxide ($Al_2O_3$) for the first seed layer 332, 30 Å of nickel manganese oxide ($Ni_{50}Mn_{50}O$) for the second seed layer 334, 5 Å of cobalt iron ($Co_{90}Fe_{10}$) for the first layer 318, 40 Å of nickel iron ($Ni_{82}Fe_{18}$) for the free layer 316, 15 Å of cobalt iron ($Co_{90}Fe_{10}$) for the nanolayer 320, 24 Å of copper (Cu) for the spacer layer 304, 35 Å of cobalt iron ($Co_{90}Fe_{10}$) for the pinned layer 308, 250 Å of nickel manganese ($Ni_{48}Mn_{52}$) for the pinning layer 310 and 50 Å of tantalum (Ta) for the cap layer 314.

Upon testing the example 300 in FIG. 12 the magnetoresistive coefficient dr/R was 6.4%, the ferromagnetic coupling field H$_{FC}$ between the pinned and free layers 308 and 320 was 8 Oe and the coercivity H$_C$ of the free layer structure 306 was 8.2 Oe.

EXAMPLE 2

Second Comparative Example of the Spin Valve Sensor

Figure 13:
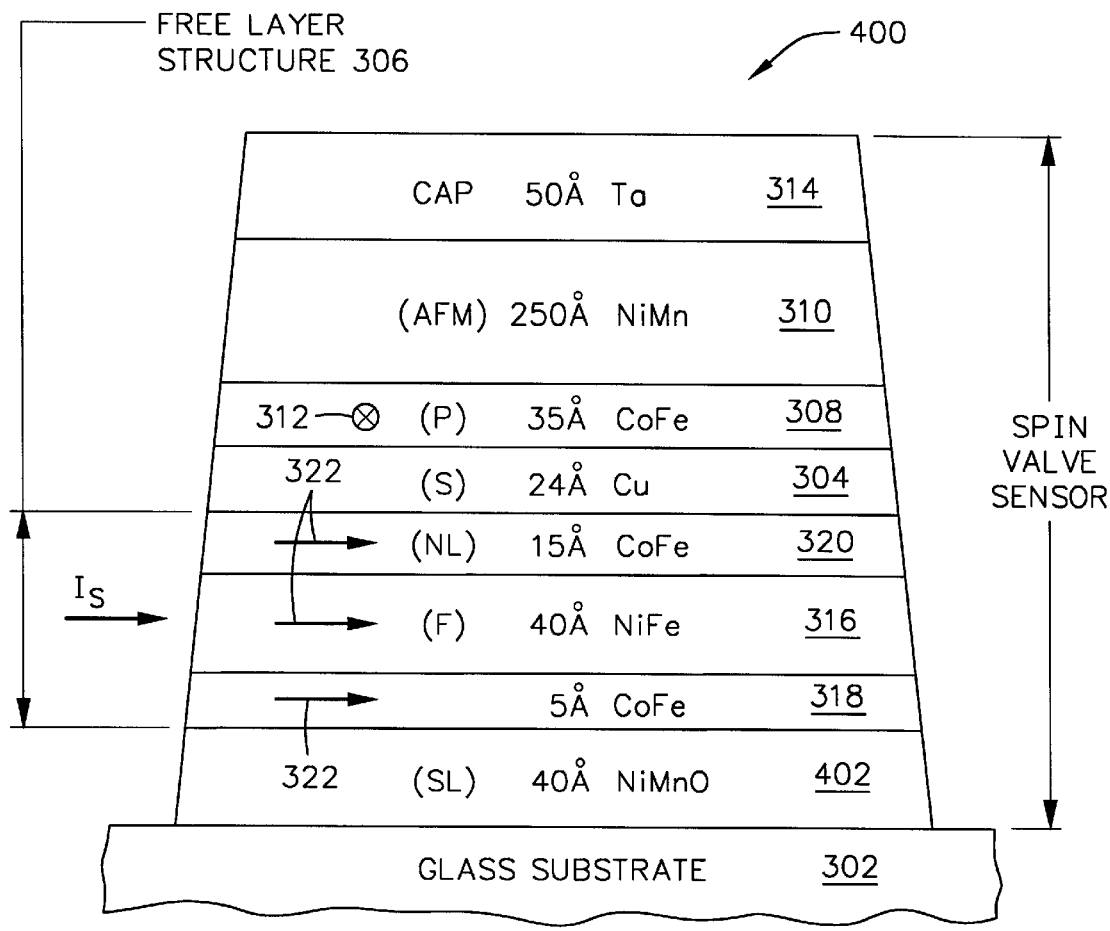
FIG. 13 is an ABS illustration of a second comparative example of a spin valve sensor.

The second comparative example 400 of the spin valve sensor is shown in FIG. 13 and is the same as the comparative example 300 in FIG. 12 except the first seed layer 332 was omitted and the first seed layer is a single seed layer (SL) 402 which is 40 Å of nickel manganese oxide (Ni$_{50}$Mn$_{50}$O). The seed layer 402 was deposited directly on the glass substrate 302 and the free layer structure 306 was directly deposited on the seed layer 402.

Upon testing the second comparative example 400 the magnetoresistive coefficient dr/R was 6.34%, the ferromagnetic coupling field H$_{FC}$ between the pinned layer 308 and the free layer structure 306 was 7.1 Oe and the coercivity H$_C$ of the free layer structure 306 was 7.5 Oe. In comparing the first and second comparative examples 300 and 400 in FIGS. 12 and 13, it can be seen that the second comparative example has a slight improvement in each of the magnetoresistive coefficient dr/R, the ferromagnetic coupling field H$_{FC}$ and the coercivity H$_C$.

The Invention

EXAMPLE 3

Present Spin Valve Sensor with Improved Seed Layer Structure

Figure 14:
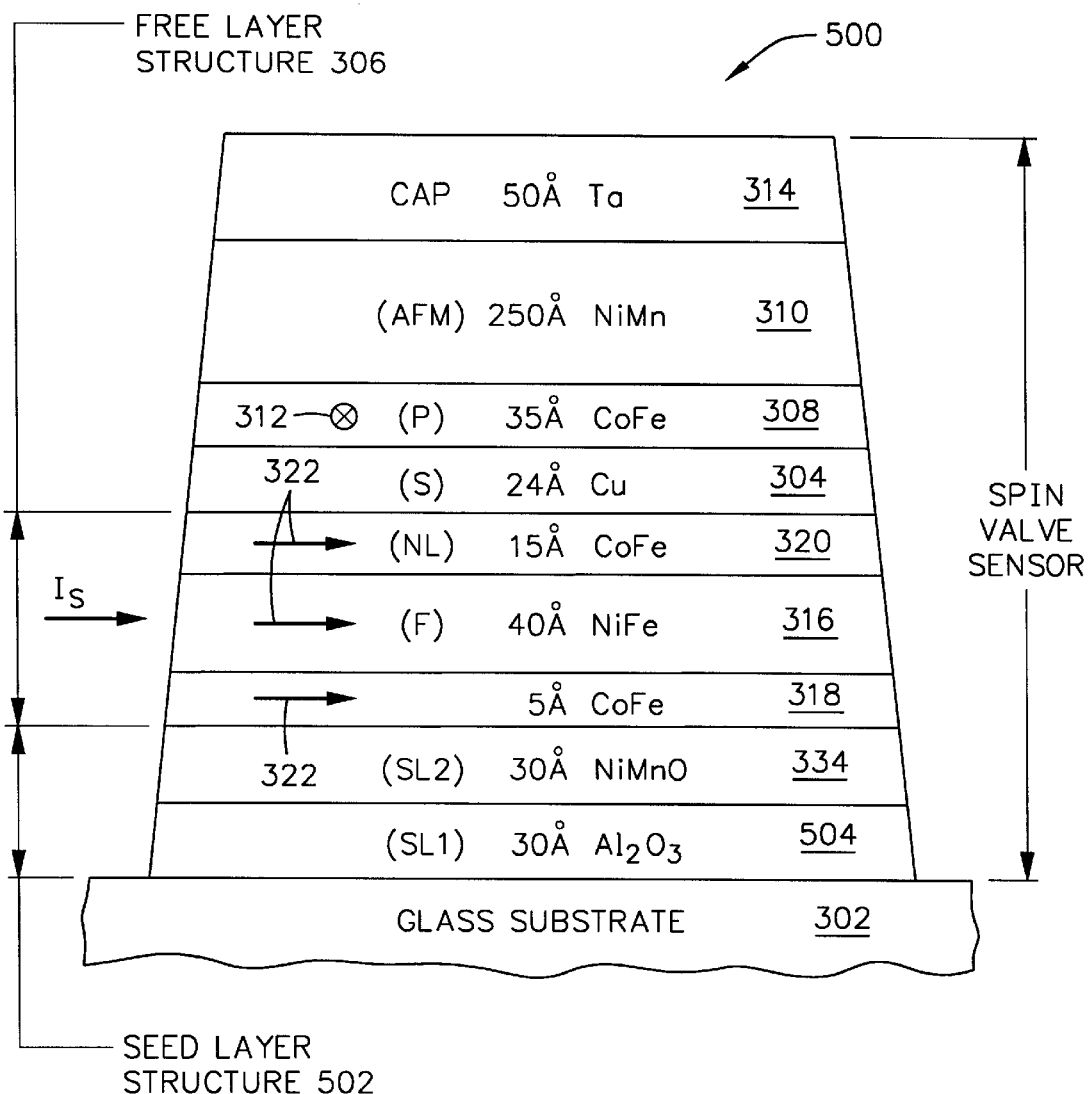
FIG. 14 is an ABS illustration of an example of the present invention.

The present spin valve sensor 500, in FIG. 14, is the same as the spin valve sensor 300 in FIG. 12 except for a seed layer structure 502 and its method of construction. The seed layer structure 502 is the same as the seed layer structure 330 in FIG. 12 except the first seed layer 504 is 30 Å of aluminum oxide (Al$_2$O$_3$) instead of 600 Å of aluminum oxide (Al$_2$O$_3$).

The seed layer structure 502 in FIG. 14 was constructed in-situ in contrast to the seed layer structure 330 in FIG. 12 which was constructed ex-situ. The first seed layer 504 was ion beam sputter deposited on the glass substrate 302 in a sputtering chamber under a specified vacuum pressure. Without breaking this vacuum pressure the second seed layer 334 was ion beam sputter deposited directly on the first seed layer 504. This was followed by ion beam sputter depositing the remainder layers of the spin valve sensor as shown in FIG. 14.

Upon testing the present spin valve sensor 500, shown in FIG. 14, the magnetoresistive coefficient dr/R was 7.0%, the ferromagnetic coupling field H$_{FC}$ between the pinned layer 308 and the free layer structure 306 was 6.77 Oe and the coercivity H$_C$ of the free layer structure 306 was 6.7 Oe. It can be seen that there is significant improvement in each of the magnetoresistive coefficient dr/R, the ferromagnetic coupling field H$_{FC}$ and the coercivity H$_C$ of the present invention 500 as compared to the first and second comparative examples in FIGS. 12 and 13.

The following chart compares the foregoing three examples.

| Example | Seed Structure | dr/R | H$_{FC}$ (Oe.) | H$_C$ (Oe.) |
|---|---|---|---|---|
| 1 | Ex-situ Al$_2$O$_3$ (600Å)/NiMnO(30Å) | 6.4 | 8 | 8.2 |
| 2 | NiMnO (40Å) | 6.34 | 7.1 | 7.5 |
| 3 | In-situ Al$_2$O$_3$ (30Å)/NiMnO(30Å) | 7 | 6.77 | 6.7 |

Figure 15:
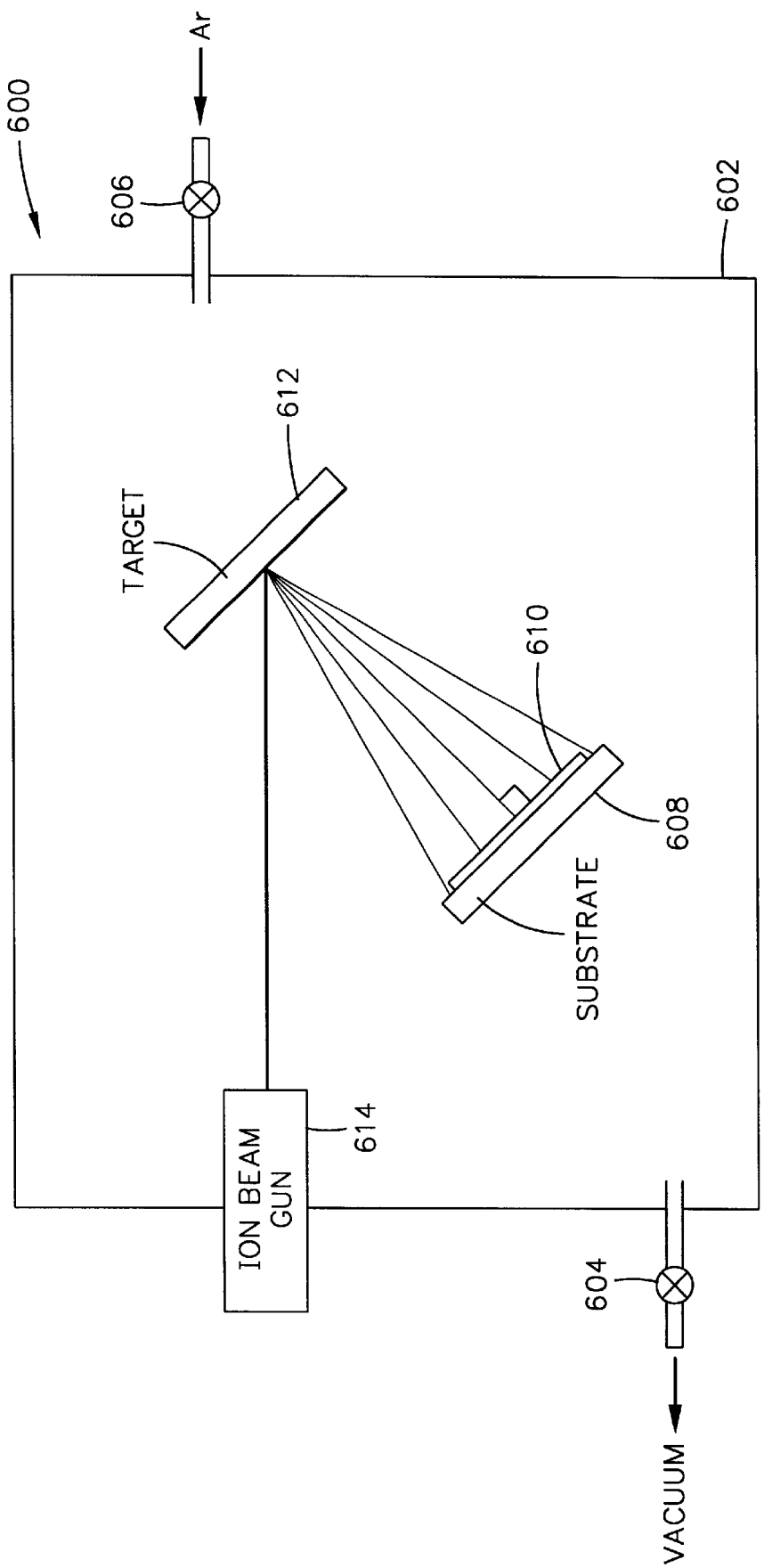
FIG. 15 is a schematic illustration of an ion beam sputtering chamber.

An exemplary sputtering system 600 which may be employed for forming the layers is shown in FIG. 15. The sputtering system 600 includes a chamber 602 which has a valve controlled outlet 604 and a valve controlled inlet 606. The outlet 604 is for the purpose of drawing a vacuum in the chamber and the inlet 606 is for the purpose of introducing an inert gas, such as Argon (Ar), into the chamber. Mounted within the chamber is a substrate 608 which supports a wafer 610 upon which layers of the read head are formed. Opposite the wafer and substrate is a target 612 composed of the material to be sputter deposited on the wafer 610. An ion beam gun 614 is mounted at one end of the chamber 602 for the purpose of directing a beam of ions onto the target 612. Within the ion beam gun high energy electrons collide with atoms, such as argon (Ar) or xenon (Xe) atoms, knocking out one of the electrons of each atom causing atoms to be ionized with a positive charge. Electrons knocked out of the atoms have high energy which knock out additional electrons from other atoms which creates a plasma within the ion beam gun 614. Ionized atoms from the ion beam gun strike the target 612 which causes the material of the target to be sputtered and deposited on the wafer 610.

The sputtering system 600 has the capability of selectively rotating various materials at the target location 612 so that various layers of different materials can be deposited on the wafer 610. In the present method of depositing the first and second seed layers 504 and 334 of the present invention in FIG. 14 aluminum (Al) is first rotated to a target position followed by rotating nickel manganese (NiMn) to the target position without breaking the vacuum in the sputtering chamber 600.

Figure 16:
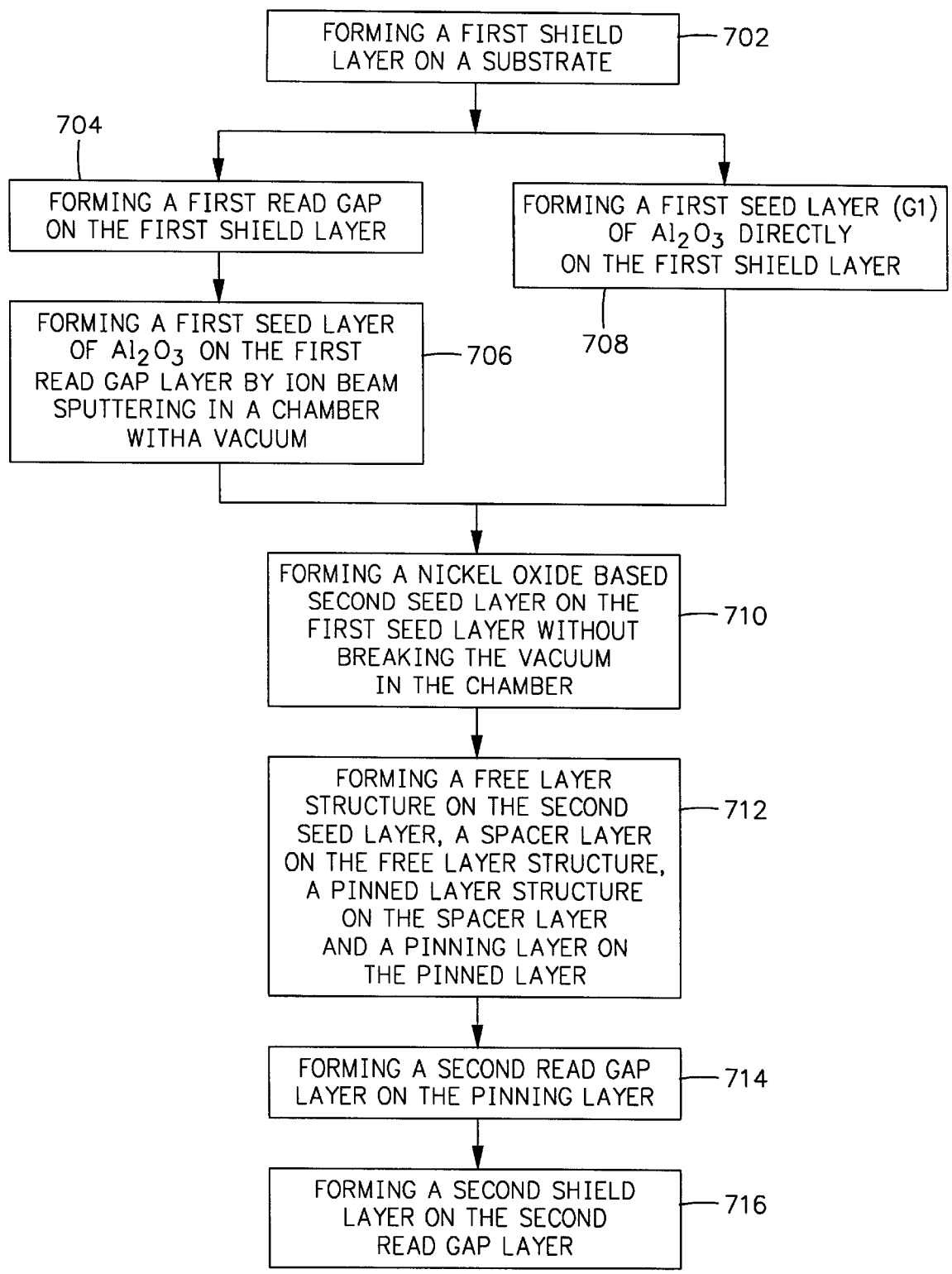
FIG. 16 is a block diagram illustrating exemplary steps of the present method.

The method of the invention is shown in diagram form in FIG. 16. In block 702 a first shield layer, such as first shield layer 152 in FIG. 11, is deposited on the wafer 610 in FIG. 15. In one embodiment of the invention the block 704 shows a first read gap layer, such as read gap layer 148 in FIG. 11, being deposited on the first shield layer 152. The vacuum in the sputtering chamber may be broken after this step followed by block 706 wherein a first seed layer of aluminum oxide (Al$_2$O$_3$) is deposited on the first read gap layer by ion beam sputtering in a chamber with a vacuum, such as the chamber 600 in FIG. 15. In a second embodiment which is shown in block 708 a first seed layer of aluminum oxide (Al$_2$O$_3$), which functions as a first gap layer (G1) 148, is deposited directly on the first shield layer which step is shown by depositing the first seed layer 504 in FIG. 14 except the first seed layer is deposited on a first shield layer instead of the glass substrate 302.

In either embodiment the block 710 shows the next step of forming a nickel oxide based second seed layer (the second seed layer 334 in FIG. 14) on the first seed layer (the seed layer 504 in FIG. 14) without breaking the vacuum in the ion beam sputtering chamber shown in FIG. 15. After the step in 710 the first embodiment has a first read gap layer and a first seed layer located between the first shield layer and the nickel oxide based second seed layer while the second embodiment has only the first seed layer (serves as G1) located between the first shield layer and the nickel oxide based second seed layer. Next, as shown in block 712, the free layer structure 306, the spacer layer 304, the pinned layer 308, the pinning layer 310 and the cap layer 314 in FIG. 14 are sequentially formed on the seed layer structure 502.

In block 714 a second read gap layer, such as the second read gap layer 150 in FIG. 11, is deposited on the cap layer 314. This is followed by forming a second shield layer, such as second shield layer 154 in FIG. 11, on the second read gap layer 150 as shown in block 716.

DISCUSSION

While the preferred percentage composition of the various elements of the alloys are $Co_{90}Fe_{10}$, $Ni_{82}Fe_{18}$ and $Ni_{50}Mn_{50}O$ it should be understood the percentage of each element can be any amount provided the total for each alloy equals 100%. It should also be understood that the pinned layer 308 in FIG. 14 may be an AP pinned layer structure as discussed hereinabove. Further, the pinning layer may be other antiferromagnetic materials such as platinum manganese (PtMn), iridium manganese (IrMn) or iron manganese (FeMn). The preferred free layer structure is as shown in FIG. 14, however, the free layer structure may simply be a single free layer 316 or the free layer 316 and the nanolayer 320. The second seed layer 334 may be nickel oxide based, however, the preferred second seed layer is nickel manganese oxide (NiMnO). Further, the thicknesses of the layers are exemplary and may be other than that shown in FIG. 14. In the invention the glass substrate 302 in FIG. 14 is a first shield layer as shown at 152 in FIG. 11. The read head may be combined with a write head as shown in FIGS. 6–9 and employed in a disk drive shown in FIGS. 1–3.

When the targets are aluminum (Al) and nickel manganese (NiMn) an oxygen atmosphere is employed in the sputtering chamber for reactive deposition. When the targets are aluminum oxide ($Al_2O_3$) and nickel manganese oxide (NiMnO) or nickel oxide (NiO) an inert atmosphere is employed for nonreactive sputtering. Other sputtering chambers may be employed in lieu of an ion beam sputtering chamber.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method of making a magnetic read head comprising the steps of:
    making a spin valve sensor as follows:
        ion beam sputtering a first seed layer composed of aluminum oxide ($Al_2O_3$) in an ion beam sputtering chamber with the chamber maintained with a vacuum;
        without breaking said vacuum, ion beam sputtering a second seed layer composed of a nickel oxide based material directly on the first seed layer in said chamber so that the first and second seed layers interface each other;
        forming a free layer structure directly on the second seed layer so that the free layer structure and the second seed layer interface one another with the free layer structure having a magnetic moment that is free to rotate in response to signal fields;
        forming a nonmagnetic conductive spacer layer directly on the free layer structure;
        forming a ferromagnetic pinned layer structure directly on and interfacing the spacer layer that has a magnetic moment; and
        forming an antiferromagnetic pinning layer directly on and interfacing the pinned layer structure for pinning the magnetic moment of the pinned layer structure.

2. A method of making a magnetic read head as claimed in claim 1 wherein the second seed layer is composed of nickel manganese oxide (NiMnO).

3. A method of making a magnetic read head as claimed in claim 2 wherein the free layer structure includes:
    a nickel iron (NiFe) free layer and first and second cobalt iron (CoFe) layers with the nickel iron (NiFe) free layer being located between the first and second cobalt iron (CoFe) layers; and
    the first cobalt iron (CoFe) layer interfacing the second seed layer.

4. A method of making a magnetic read head as claimed in claim 1 including:
    forming a ferromagnetic first shield layer;
    forming a nonmagnetic nonconductive second read gap layer with the spin valve sensor located between the first shield layer and the second read gap layer; and
    forming a ferromagnetic second shield layer with the spin valve sensor and the second read gap layer located between the first and second shield layers.

5. A method of making a magnetic read head as claimed in claim 4 including:
    forming a nonmagnetic nonconductive first read gap layer on the first shield layer; and
    the forming of the first seed layer forms the first seed layer on the first read gap layer between the first read gap layer and the second seed layer.

6. A method of making a magnetic read head as claimed in claim 5 wherein the second seed layer is composed of nickel manganese oxide (NiMnO).

7. A method of making a magnetic read head as claimed in claim 6 wherein the free layer structure includes:
    a nickel iron (NiFe) free layer and first and second cobalt iron (CoFe) layers with the nickel iron (NiFe) free layer being located between the first and second cobalt iron (CoFe) layers; and
    the first cobalt iron (CoFe) layer interfacing the second seed layer.

8. A method of making a magnetic read head as claimed in claim 4 wherein the first seed layer is formed between and interfaces each of the first shield layer and the second seed layer.

9. A method of making a magnetic read head as claimed in claim 4 wherein the first seed layer is the only layer between the first shield layer and the second seed layer and functions as a nonmagnetic nonconductive first read gap layer.

10. A method of making a magnetic read head as claimed in claim 9 wherein the second seed layer is composed of nickel manganese oxide (NiMnO).

11. A method of making a magnetic read head as claimed in claim 10 wherein the free layer structure includes:
    a nickel iron (NiFe) free layer and first and second cobalt iron (CoFe) layers with the nickel iron (NiFe) free layer being located between the first and second cobalt iron (CoFe) layers; and
    the first cobalt iron (CoFe) layer interfacing the second seed layer.

12. A method of making a magnetic head assembly comprising the steps of:

making a write head as follows:
   forming ferromagnetic first and second pole piece layers in pole tip, yoke and back gap regions wherein the yoke region is located between the pole tip and back gap regions;
   forming a nonmagnetic nonconductive write gap layer between the first and second pole piece layers in the pole tip region;
   forming an insulation stack with at least one coil layer embedded therein between the first and second pole piece layers in the yoke region; and
   connecting the first and second pole piece layers at said back gap region; and
making a read head as follows:
   forming a spin valve sensor with first and second seed layers that interface one another with the first seed layer being aluminum oxide ($Al_2O_3$) and the second seed layer being nickel oxide based;
   forming a nonmagnetic second read gap layer;
   forming a ferromagnetic first shield layer with the spin valve sensor located between the first shield layer and the second read gap layer and the spin valve sensor and the second read gap layer located between the first shield layer and the first pole piece layer; and
making the spin valve sensor as follows:
   forming the first seed layer by ion beam sputtering aluminum oxide ($Al_2O_3$) in an ion beam sputtering chamber with the chamber maintained with a vacuum;
   without breaking said vacuum, forming the second seed layer by ion beam sputtering a nickel oxide based material directly on the first seed layer in said chamber;
   forming a ferromagnetic free layer structure directly on and interfacing the second seed layer that has a magnetic moment that is free to rotate in response to signal fields;
   forming a nonmagnetic conductive spacer layer directly on and interfacing the free layer structure;
   forming a ferromagnetic pinned layer structure directly on and interfacing the spacer layer that has a magnetic moment; and
   forming an antiferromagnetic pinning layer directly on and interfacing the pinned layer structure for pinning the magnetic moment of the pinned layer structure.

13. A method of making a magnetic head assembly as claimed in claim 12 including:
   forming a ferromagnetic second shield layer;
   forming a nonmagnetic isolation layer between the second shield layer and the first pole piece layer.

14. A method of making a magnetic head assembly as claimed in claim 12 including:
   forming a nonmagnetic nonconductive first read gap layer with the first read gap layer located between and interfacing each of the first shield layer and the first seed layer.

15. A method of making a magnetic head assembly as claimed in claim 14 wherein the second seed layer is composed of nickel manganese oxide (NiMnO).

16. A method of making a magnetic head assembly as claimed in claim 15 wherein the free layer structure includes:
   a nickel iron (NiFe) free layer and first and second cobalt iron (CoFe) layers with the nickel iron (NiFe) free layer being located between the first and second cobalt iron (CoFe) layers; and
   the first cobalt iron (CoFe) layer interfacing the second seed layer.

17. A method of making a magnetic head assembly as claimed in claim 12 wherein the first seed layer is the only layer between the first shield layer and the second seed layer and functions as a nonmagnetic nonconductive first read gap layer.

18. A method of making a magnetic head assembly as claimed in claim 17 wherein the second seed layer is composed of nickel manganese oxide (NiMnO).

19. A method of making a magnetic head assembly as claimed in claim 18 wherein the free layer structure includes:
   a nickel iron (NiFe) free layer and first and second cobalt iron (CoFe) layers with the nickel iron (NiFe) free layer being located between the first and second cobalt iron (CoFe) layers; and
   the first cobalt iron (CoFe) layer interfacing the second seed layer.

20. A method of making a read head comprising the steps of:
   providing a sputtering chamber;
   providing a substrate in the chamber;
   providing an aluminum (Al) or aluminum oxide ($Al_2O_3$) target in the sputtering chamber opposite said substrate;
   providing an ion beam gun in the chamber;
   pulling a vacuum in the chamber;
   bombarding the aluminum (Al) target in an oxygen atmosphere or aluminum oxide ($Al_2O_3$) target with ions from the ion beam gun causing aluminum (Al) or aluminum oxide ($Al_2O_3$) to be sputtered from the target and deposited on the substrate to form a first seed layer of aluminum oxide ($Al_2O_3$) thereon;
   providing a nickel based target opposite said substrate in the chamber;
   without breaking said vacuum bombarding the nickel based target with ions from the ion beam gun in an oxygen atmosphere causing material to be sputtered from the nickel based target to form a nickel oxide based second seed layer directly on and interfacing the first seed layer;
   depositing a ferromagnetic free layer structure that has a magnetic moment that is free to rotate in response to signal fields directly on and interfacing the second seed layer;
   depositing a nonmagnetic conductive spacer layer directly on and interfacing the free layer structure;
   depositing a ferromagnetic pinned layer structure that has a magnetic moment directly on the spacer layer; and
   depositing an antiferromagnetic pinning layer directly on and interfacing the pinned layer structure for pinning the magnetic moment of the pinned layer structure.

21. A method of making a read head as claimed in claim 20 wherein the nickel based target is nickel manganese (NiMn) or nickel manganese oxide (NiMnO).

22. A method of making a read head as claimed in claim 20 including:
   forming a first shield layer;
   forming a second read gap layer with the spin valve sensor located between the first shield layer and the second read gap layer;

forming a second shield layer with the spin valve sensor and the second read gap layer located between the first and second shield layers.

23. A method of making a read head as claimed in claim 22 wherein the nickel based target is nickel manganese (NiMn) or nickel manganese oxide (NiMnO).

24. A method of making a read head as claimed in claim 22 including:

forming a first read gap layer of aluminum oxide ($Al_2O_3$) on the first shield layer; and the forming of the first seed layer forms the first seed layer on the first read gap layer.

25. A method of making a read head as claimed in claim 24 wherein the nickel based target is nickel manganese (NiMn) or nickel manganese oxide (NiMnO).

26. A method of making a read head as claimed in claim 22 wherein the first seed layer is the only layer formed between the first shield layer and the second seed layer.

27. A method of making a read head as claimed in claim 26 wherein the nickel based target is nickel manganese (NiMn) or nickel manganese oxide (NiMnO).

* * * * *